United States Patent Office

2,917,515
Patented Dec. 15, 1959

2,917,515

PHENYL-QUINUCLIDINE COMPOUNDS

Cyril Grob, Basel, Switzerland, assignor to Ciba Pharmaceutical Products, Inc., Summit, N.J.

No Drawing. Application September 9, 1957
Serial No. 682,576

Claims priority, application Switzerland
September 20, 1956

4 Claims. (Cl. 260—293)

This invention provides as new compounds 3-phenyl-quinuclidines, and salts and quaternary compounds thereof. The invention provides more especially 3-phenyl-quinuclidines, which are unsubstituted in the 3-position or contain a hydroxyl group in that position or contain a double bond in the 2:3-position, and salts thereof. They may contain further substituents, more especially in the phenyl radical, for example, a free or substituted hydroxyl group such as an alkoxy group, or a nitro group or a free or substituted amino group, for example, a dimethylamino group, or a halogen atom.

The new compounds possess the property of stimulating the central nervous system and cause excitation of the respiratory center, which is especially effective in cases where breathing has been checked under the influence of hypnotics. Accordingly, the new compounds are useful as stimulants in cases of poisoning, for example, by barbituric acid derivatives or the like. Especially active is $\Delta^2$-3-phenyl-quinuclidine and salts thereof, and slightly less active is 3-phenyl-3-hydroxy-quinuclidine.

The aforesaid 3-phenyl-quinuclidines and their derivatives are obtained by reacting a 3-quinuclidone with a phenyl-metal compound, if desired, treating the resulting 3-phenyl-3-hydroxy-quinuclidine with an agent capable of eliminating water, and, if desired, hydrogenating the double bond in the $\Delta^2$-quinuclidene so obtained. As phenyl-metal compounds there may be used those of alkali metals or of the Grignard type, for example, phenyl-magnesium-halides. The reaction is carried out in the customary manner. Thus, it is of advantage to work in the presence of anhydrous ether, tetrahydrofurane or benzene. The metal compound formed by the reaction can be decomposed, for example, by reaction with water, a dilute acid or an aqueous solution of an ammonium salt. The elimination of water may be carried out, for example, by means of thionyl chloride or oxalic acid. For the hydrogenation there may be used catalytically activated hydrogen, for example, hydrogen in the presence of a noble metal catalyst, such as platinum or palladium, or in the presence of a nickel catalyst.

Depending on the process used the new compounds are obtained in the form of the free bases or salts thereof. From the salts the bases can be obtained in the usual manner, and free bases can be converted into their salts by methods in themselves known. In order to form therapeutically useful salts inorganic acids may be used, for example, hydrohalic acids, sulfuric acids, nitric acid, phosphoric acids, thiocyanic acid or organic acids, for example, acetic acid, propionic acid, oxalic acid, malonic acid, succinic acid, malic acid, methane sulfonic acid, ethane sulfonic acid, oxyethane sulfonic acid, benzene sulfonic acid or toluene sulfonic acid or therapeutically active acids. The new bases can be converted into quaternary ammonium salts by treatment with quaternating agents, for example, by reaction with reactive esters of lower alkanols, for example, alkyl halides, dialkyl sulfates or alkyl esters of organic sulfonic acids, such as toluene sulfonic acid.

The new compounds are useful as medicaments, for example, in the form of pharmaceutical preparations which contain the base or a salt thereof in admixture with a pharmaceutical organic or inorganic carrier suitable for enteral, parenteral or topical administration. For making the carrier there are used substances which do not react with the new compound, for example, water, gelatine, lactose, starches, magnesium stearate, talc, vegetable oils, benzyl alcohols, gums, polyalkylene glycols, white petroleum jelly, cholesterol or another carrier known for medicaments. The pharmaceutical preparations may be in the form, for example, of tablets, dragees, salves, creams or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances. The preparations are made up by the customary methods.

The following examples illustrate the invention:

*Example 1*

A Grignard compound is prepared from 120 grams of bromobenzene and 19.2 grams of magnesium in 450 cc. of ether. A solution of 31 grams of quinuclidone in 100 cc. of ether is added dropwise to the Grignard solution in the course of one hour, while stirring and cooling with ice, whereupon a black oily layer separates out. The whole is then stirred for a further 14 hours at 25° C. and then (under reflux) for 5 hours. After cooling the mixture the product is decomposed with water while cooling with ice, the mixture is acidified to Congo red with concentrated hydrochloric acid and the ethereal layer is separated off. The aqueous layer is extracted twice with 200 cc. of ether on each occasion. The aqueous solution is then rendered alkaline with a saturated aqueous solution of potassium carbonate. The precipitated magnesium carbonate is filtered off, then washed three times with 100 cc. of chloroform on each occasion, dried and extracted with chloroform for 15 hours in a Soxhlet apparatus. The filtrate is extracted six times with a total of 1 liter of chloroform. All the chloroform solutions are united, dried over potassium carbonate, filtered and evaporated to dryness. The resulting 3-hydroxy-3-phenyl-quinuclidine obtained as a crystalline residue weighs 41 grams and melts at 164–167° C., after recrystallisation once from a mixture of chloroform and petroleum ether. By further recrystallisation from a mixture of absolute ethanol and petroleum ether the melting point is raised to 166–168° C. The metho-iodide obtained from the base melts at 230–231° C., after recrystallisation from ethanol.

*Example 2*

10 grams of 3-hydroxy-3-phenyl-quinuclidine are dissolved in portions in 150 cc. of thionyl chloride, while cooling with ice. The solution is heated for 15 hours under reflux. Then the greater part of the thionyl chloride is distilled off under atmospheric pressure and the remainder is removed in vacuo. The crystalline hygroscopic residue is dissolved in a small amount of water, rendered alkaline with a saturated aqueous solution of potassium carbonate, and extracted three times with 100 cc. of ether on each occasion. The combined ethereal solutions are dried over potassium carbonate, filtered and the ether is distilled off on a steam bath. The feebly yellow oily residue distills at 150–153° C. under 12 mm. pressure, and there are obtained 8.55 grams of $\Delta^2$-phenyl-quinuclidine in the form of a colorless oil.

The following salts of the base can be prepared in a customary manner: Picrate melts at 157–158° C. after recrystallisation from ethanol; perchlorate melts at 163–164° C. after recrystallisation from acetone-ethanol; metho-perchlorate melats at 169–170° C. after recrystallisation from acetone-ethanol.

Example 3

2.85 grams of the perchlorate of $\Delta^2$-3-phenyl-quinuclidene are dissolved in 45 cc. of methanol and hydrogenated under atmospheric pressure with palladium-charcoal containing 10 percent of palladium as catalyst. When the absorption of hydrogen has ceased, the catalyst is filtered off. The filtrate is evaporated to dryness in vacuo, and the crystalline residue so obtained is recrystallised from methanol. There are obtained 2.55 grams of 3-phenyl-quinuclidine melting at 152° C. A pictrate prepared from the base can be recrystallised from a mixture of ethanol and ether, and then melts at 143–145° C.

Example 4

A solution of para-dimethylaminophenyl-lithium is prepared from 3.12 grams of lithium and 40 grams of para-bromo-dimethylaniline in 60 cc. of absolute ether. A solution of 9.25 grams of 3-quinuclidone in 100 cc. of ether is added dropwise while stirring and cooling with ice in the course of 45 minutes, whereby a white sludgy precipitate is formed. Then the whole is stirred for a further 10 hours at 22° C. and for six hours under reflux. The reaction mixture is then cooled with ice water, decomposed with 50 cc. of 2 N-hydrochloric acid, and acidified with a concentrated aqueous solution of hydrochloric acid to Congo red. The ethereal layer is separated off, the aqueous layer is extracted twice with 100 cc. of ether on each occasion, then rendered alkaline with a saturated aqueous solution of potassium carbonate, and extracted six times with 100 cc. of chloroform on each occasion. The combined chloroform extracts are dried over solid potassium carbonate, filtered and evaporated to dryness. There are obtained 15.5 grams of a blue-grey oily residue, which crystallises on cooling. After recrystallisation from benzene there is obtained 3-hydroxy-3-(paradimethylaminophenyl)-quinuclidine containing ½ mol of benzene of crystallisation per mol of base, which melts at 75–80° C. and 121–123° C. In order to remove the benzene the product is subjected to distillation in a high vacuum, boiling takes place at 167–171° C. under 0.05 mm. pressure. The distillate solidifies on cooling, and, after recrystallisation from a mixture of acetone and ether, melts at 122–123° C. A picrate prepared therefrom can be recrystallised from a mixture of acetone and ether. It melts at 149–150° with decomposition, solidifies again and then melts at 201–204° C.

Example 5

6 grams of 3-hydroxy-3-(para-dimethylaminophenyl)-quinuclidine are heated in a Claisen flask with 50 milligrams of crystalline oxalic acid under 12 mm. pressure at 200° C. At a bath temperature of 150° C. the elimination of water commences. The mixture is maintained at 200° C. for ½ hour. Distillation is then carried out in a high vacuum and there are obtained at 120–122° C. under 0.05 mm. pressure 5.5 grams of a colorless distillate, which solidifies on cooling. After further distillation in a high vacuum and recrystallisation once from petroleum ether, the resulting $\Delta^2$-3-(para-dimethylaminophenyl)-quinuclidene melts at 76–78° C.

From the free base the following salts and quaternary derivatives can be obtained: Mono-picrate melting at 205–206° C. after recrystallisation from acetone; mono-methoiodide melting at 237° C. after recrystallisation from methanol-ether; mono-hydroperchlorate melting at 234–236° C. after recrystallisation from acetone.

Example 6

1.64 grams of the hydroperchlorate of $\Delta^2$-3-(para-dimethylaminophenyl)-quinuclidene are dissolved in 60 cc. of glacial acetic acid and hydrogenated over platinum as catalyst. When the calculated quantity of hydrogen has been absorbed the absorption ceases. The catalyst is filtered off and the filtrate is evaporated to dryness in vacuo. The free base is liberated from the residues and distilled is a molecular flask at 100° under 0.05 mm. pressure. The distillate is crystallised from pentane and 1.08 grams of 3-(para-dimethyleminophenyl)-quinuclidine melting at 65–67° C. are obtained.

What is claimed is:

1. A member of the group consisting of 3-Ph-quinuclidine, 3-Ph-3-hydroxy-quinuclidine and $\Delta^2$-3-Ph-quinuclidine, in which Ph stands for a member of the group consisting of phenyl and phenyl substituted by hydroxyl, lower alkoxy, nitro, amino, di-lower alkylamino and halogeno, therapeutically acceptable acid addition salts thereof and therapeutically acceptable lower alkyl quaternary ammonium halides, sulfate and sulfonates thereof.
2. 3-phenyl-quinuclidine.
3. 3-phenyl-3-hydroxy-quinuclidine.
4. $\Delta^2$-3-phenyl-quinuclidine.

References Cited in the file of this patent

UNITED STATES PATENTS

| | | |
|---|---|---|
| 2,834,779 | Biel et al. | May 13, 1958 |

FOREIGN PATENTS

| | | |
|---|---|---|
| 674,967 | Germany | Apr. 26, 1939 |

UNITED STATES PATENT OFFICE
CERTIFICATE OF CORRECTION

Patent No. 2,917,515                                 December 15, 1959

Cyril Grob

It is hereby certified that error appears in the printed specification of the above numbered patent requiring correction and that the said Letters Patent should read as corrected below.

Column 2, line 68, for "$\Delta^2$-phenyl-" read -- $\Delta^2$-3-phenyl- --; column 3, line 3, for "melats" read -- melts --; line 15, for "pictrate" read -- picrate --.

Signed and sealed this 3rd day of January 1961.

(SEAL)
Attest:

KARL H. AXLINE
Attesting Officer

ROBERT C. WATSON
Commissioner of Patents